W. A. VAN BRUNT.
SPRING PRESSURE REGULATING DEVICE.
APPLICATION FILED JULY 10, 1919.
1,340,581. Patented May 18, 1920.
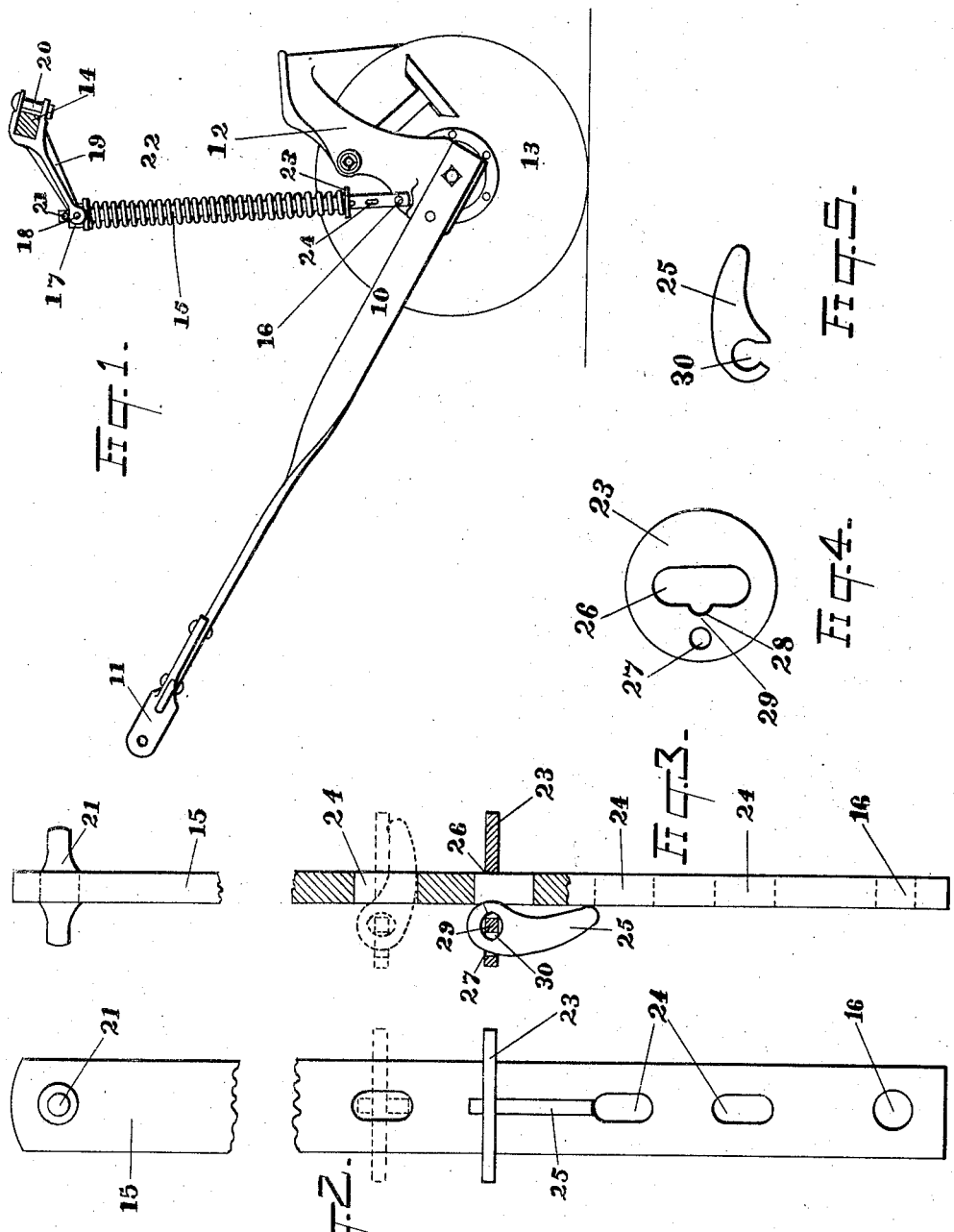

UNITED STATES PATENT OFFICE.

WILLARD A. VAN BRUNT, OF LOS ANGELES, CALIFORNIA, ASSIGNOR TO THE VAN BRUNT MANUFACTURING COMPANY, OF HORICON, WISCONSIN, A CORPORATION OF WISCONSIN.

SPRING-PRESSURE-REGULATING DEVICE.

1,340,581.     Specification of Letters Patent.     Patented May 18, 1920.

Application filed July 10, 1919. Serial No. 309,940.

*To all whom it may concern:*

Be it known that I, WILLARD A. VAN BRUNT, a citizen of the United States, and a resident of Los Angeles, in the county of Los Angeles and State of California, have invented certain new and useful Improvements in Spring-Pressure-Regulating Devices, of which the following is a specification, reference being had to the accompanying drawings.

The coiled expansion springs employed in various situations on agricultural and other machines have to be adjusted from time to time to vary the pressure exerted by them. Such springs are usually placed upon a rod or bar that connects two members of the mechanism, one of such parts being movable and held in the desired operative position under the pressure of the spring. It is the object of my invention to provide cheap, simple and effective means whereby such a spring can be adjusted with respect to the rod upon which it is mounted for varying the tension of the spring, my invention also comprising a novel construction of the said rod whereby it coöperates with the locking member movably carried thereby. I attain the object stated by the parts and combinations of parts shown in the drawings and hereinafter described.

In the drawings my invention has been illustrated in connection with a seeding-machine of the drill type, only so much thereof being illustrated as is necessary to an understanding of the invention.

In said drawings,—

Figure 1 is a side elevation of a furrow-opening element of a grain-drill showing my improvements applied thereto, the usual rock-shaft by which the furrow-openers of the machine are raised or lowered to inoperative or operative position being shown in section;

Fig. 2 is a face view of the bar upon which is mounted the coiled pressure-spring, the adjustable automatically-locking device carried by the rod being shown in full lines in the position assumed by it while being adjusted lengthwise of the bar and showing in broken lines the position it assumes when in locking engagement with the bar,—a portion of the bar being broken away;

Fig. 3 is an edge view of the bar partly in central vertical section, with the adjustable locking means in the same positions as in Fig. 2;

Fig. 4 is a detail showing the adjustable lock-washer against which the pressure of the coiled spring is exerted; and Fig. 5 is a detail of the dog carried by the washer that is shown in Fig. 4, said dog being shown as it appears before being attached to the washer.

Referring now to the various parts shown in the several views,—10 indicates one of a series of drag bars with which a seed drill will be provided, and which bar at its forward end is provided with a bracket 11 by means of which it is pivotally connected to the body of the machine as usual. 12 indicates a boot at the rear end of the drag bar, such boot having rotatably connected with it as usual a disk 13 that forms the furrow in which the seed is deposited. Each of the series of furrow opener members will be connected with a rock-shaft 14 that is rotatably supported by the seed-boxes (not shown) mounted as usual on the wheeled frame of the machine, and by the rocking of such shaft the furrow openers can be adjusted up and down to regulate the extent to which the disks shall penetrate the soil. Each of the furrow opening elements is connected with the rock-shaft by means of a rod or bar 15, which, at its lower end, is pivotally connected at 16 to the boot 12, and which, at its upper end, has loosely mounted thereon a collar 17 that has laterally projecting pins 18 to which the bifurcated forward end of an arm 19 is pivoted, the other end of the arm being clamped by means of a bolt 20 upon the rock-shaft 14. Above the collar 17 the bar 15 has secured in it a pin 21 that projects from opposite faces of the bar and acts as a stop to limit the upward movement of the collar. 22 indicates a coiled spring mounted on the bar 15 and bearing at its upper end against the collar 17, and at its lower end bearing against an adjustable abutment or contact device that is here shown in the form of a washer surrounding the said bar 15—the washer being indicated by 23. The coiled spring is interposed between the boot 12 and the arm 19 projecting from the rock-shaft so that the furrow opening element will be yieldingly held in its working position in order that should the disk come in contact with an obstruction it may readily rise without affecting the working positions of the other disks of the machine—all as is well understood in the art.

It is frequently desirable to adjust the coiled spring on its rod or bar in order to regulate the pressure of the spring, and, inasmuch as a drill will be provided with a comparatively large number of furrow opening members, the springs of which are to be independently adjusted, it is of importance that means be provided for effecting such adjustments as easily and quickly as possible, and it is with that idea in view that my improvements have been devised. In order to better embody my invention I make the member 15 that carries the spring in the form of a bar having flat faces and preferably having rounded edges—in other words approximately of oval shape in cross-section, it corresponding in shape with the central opening of the washer member 23—see Fig. 4. Through this bar are formed at intervals a series of openings 24 which are arranged along the center line of the bar and are best made of elongated form, as clearly shown in Fig. 2.

25 indicates a dog, in the approximately-circular head of which is formed an eye 30 to adapt it for attachment to the washer 23. As best shown in Fig. 4, the central elongated opening in the washer, indicated by 26, has in one of its edges a recess 28 opposite which is an opening 27 in the washer, and upon that portion of the washer between said recess 28 and opening 27 is loosely affixed, so as to turn thereon as on a pivot, the dog 25—the part referred to on which the dog is movably mounted being indicated by 29. The dog is preferably made of a piece of sheet metal, and in the form of construction shown in Fig. 5, whereby it will be evident that it can be easily slipped over the part 29 after which the eye 30 will be closed by any suitable tool so as to lock the dog to the washer, but in such manner as to allow it to rock about the part 29.

As shown, the inner edge of the dog 25—that is, the edge lying opposite the face of the bar 15—is so curved that such dog, when standing as shown in full lines in Fig. 3, will contact the face of the bar only at its end portions. When the parts are in assembled position, as in Fig. 1, the dog will be turned so that its long narrow or tail end will project through one of the holes 24 and rest upon the lower end of such hole with the spring-supporting washer 23 resting thereon, and the pressure of the spring will securely hold the dog and washer in position. The normal supporting position of the dog and washer is clearly shown in dotted lines in Fig. 3. Now if it be desired to increase the tension of the spring 15 the operator will grasp the washer 23 and lift upwardly so as to compress such spring, and in so doing the dog will turn on the part 29 of the washer and the extended or tail end that has been projected through an opening 24 will be drawn out so that as the upward movement continues the position of the dog will be as shown in full lines in Fig. 3. Upon reaching the hole 24 which it is desired to have the dog engage the washer will be forced a little above such hole and then as the operator permits the spring to expand slightly to move the washer down the effect will be to cause the free end of the dog to enter the opening. The head end of the dog has its edge curved or cam-shaped, and it is the frictional engagement of such edge with the face of the bar 15 that causes a turning of the dog just as soon as such turning is permitted by reason of the free end of the dog coming opposite the desired opening, and by reason of the outer edge of the dog being curved in a convex manner, as shown, it will, under the pressure of the spring on the washer, be compelled to move fully into the opening and come to rest on the lower end of the hole in proper position, as shown in dotted lines in Fig. 3, to give a stable support to the spring-supporting washer with which it is connected.

While the opening 26 in the washer corresponds approximately to the shape of the bar that passes through it, such opening is made sufficiently larger than the bar to permit the washer to be given a small amount of lateral play on the bar, and by reason thereof the operator when he desires to move the washer and its attached dog downwardly on the bar without having the dog automatically engage a hole 24 can do so because, after automatically disengaging the dog from a hole, as hereinbefore described, he can by slightly turning the washer move the dog so that it will contact the bar at one side of the row of holes 24 and can thus move it freely downward until the hole has been reached that it is desired to have the dog engage with, whereupon by a slight reverse turning of the washer the dog will again be brought into the path of the holes and caused to enter the desired one of such holes in the manner described.

By my improvements I provide means by which the tension on a coiled spring that surrounds a rod or bar can be very quickly and easily adjusted, and which, after the desired adjustment has been obtained, will securely hold in place the abutment or washer against which the spring bears.

What I claim as my invention and desire to secure by Letters Patent, is—

1. A device of the class described, comprising in combination a rod having a plurality of alined openings therethrough, a coiled spring on the rod, an abutment for one end of the spring movable longitudinally of the rod, and a dog movably connected with said abutment and normally projecting into one of said openings to support said abutment.

2. A device of the class described, comprising in combination a rod having a plurality of alined openings therethrough, a coiled spring on the rod, an abutment for one end of the spring movable longitudinally of the rod, a dog pivotally connected near one of its ends with said abutment to permit its free end to be turned into one of said openings to lie beneath and lock the abutment in place.

3. A device of the class described, comprising in combination a rod having a plurality of alined openings therethrough, a coiled spring on the rod, an abutment for one end of the spring movable longitudinally of the rod, a dog pivotally connected near one of its ends with said abutment to permit its free end to be turned into one of said openings to lie beneath and lock the abutment in place, said dog having the upper portion of its inner edge in frictional contact with the surface of the rod to compel a projection of its free end into the opening when said abutment is moved along the rod by the pressure of the spring.

4. A device of the class described, comprising in combination a rod having a plurality of alined openings therethrough, a coiled spring on the rod, an abutment movable longitudinally of the rod and against which one end of the spring presses, and a dog pivotally connected near one of its ends with said abutment, said dog having its inner edge concave and in contact at its ends with the rod when said abutment is moved, whereby the free end of the dog will be forced into one of said openings as the abutment is moved by the pressure of the spring.

5. A device of the class described, comprising in combination a rod having a plurality of alined openings therethrough, a coiled spring on the rod, an abutment movable longitudinally of the rod and against which one end of the spring presses, and a dog pivotally connected near one of its ends with said abutment, said dog having its inner edge concave and its outer edge convex to facilitate it being projected into and withdrawn from any one of said openings.

6. A device of the class described, comprising in combination a rod having a plurality of alined openings therethrough, a coiled spring on the rod, an abutment movable longitudinally of the rod and against which one end of the spring bears, and a dog pivotally connected with said abutment adapted to automatically enter one of said openings when the abutment is moved along the rod under the pressure of the spring and to be withdrawn therefrom when the abutment is moved in the opposite direction.

7. A device of the class described, comprising in combination a rod having a plurality of alined openings therethrough, a coiled spring on the rod, an abutment movable longitudinally of the rod and against which one end of the spring bears, and a dog pivotally connected near one of its ends with said abutment and adapted to have its other end automatically projected into and through one of said openings when the abutment is moved along the rod under the pressure of the spring, said inner end when so projected furnishing a support for the abutment at the opposite side of the rod.

8. A device of the class described, comprising in combination a rod having a flat face and a plurality of alined openings in said face extending through the rod, an abutment surrounding the rod and slidingly mounted thereon, a coiled spring on said rod and pressing against said abutment, and a dog pivotally attached near one of its ends to said abutment opposite the flat face of the rod, the edge of the dog opposite the rod being concave and in contact at its ends only with the flat face of the rod when said abutment is moved, whereby the free end of the dog will be projected into one of said openings and beneath the abutment as the abutment is moved under the pressure of the spring.

9. A device of the class described, comprising in combination a rod having a plurality of openings therethrough, a coiled spring on the rod, an abutment movable longitudinally of the rod and also having a limited lateral movement thereon, against which abutment one end of said spring bears, and a dog pivotally connected with said abutment and adapted by a movement of the abutment longitudinally of the rod to be moved into one of said openings beneath the abutment or by a lateral movement of the abutment be carried to one side of the line of openings.

10. A device of the class described, comprising in combination a rod having a plurality of openings therethrough, a coiled spring on the rod, an abutment for said spring to bear against having an opening through which the rod loosely passes and having a recess in the edge of such opening and a second opening between the outer edge of the abutment and said recess, and a dog loosely mounted on the material of the abutment between said recess and second-named opening, said dog being adapted to be normally projected into one of said openings beneath said abutment.

WILLARD A. VAN BRUNT.